FEED CONTROL MECHANISM FOR MATERIAL SPREADERS
Original Filed April 20, 1955 4 Sheets-Sheet 1
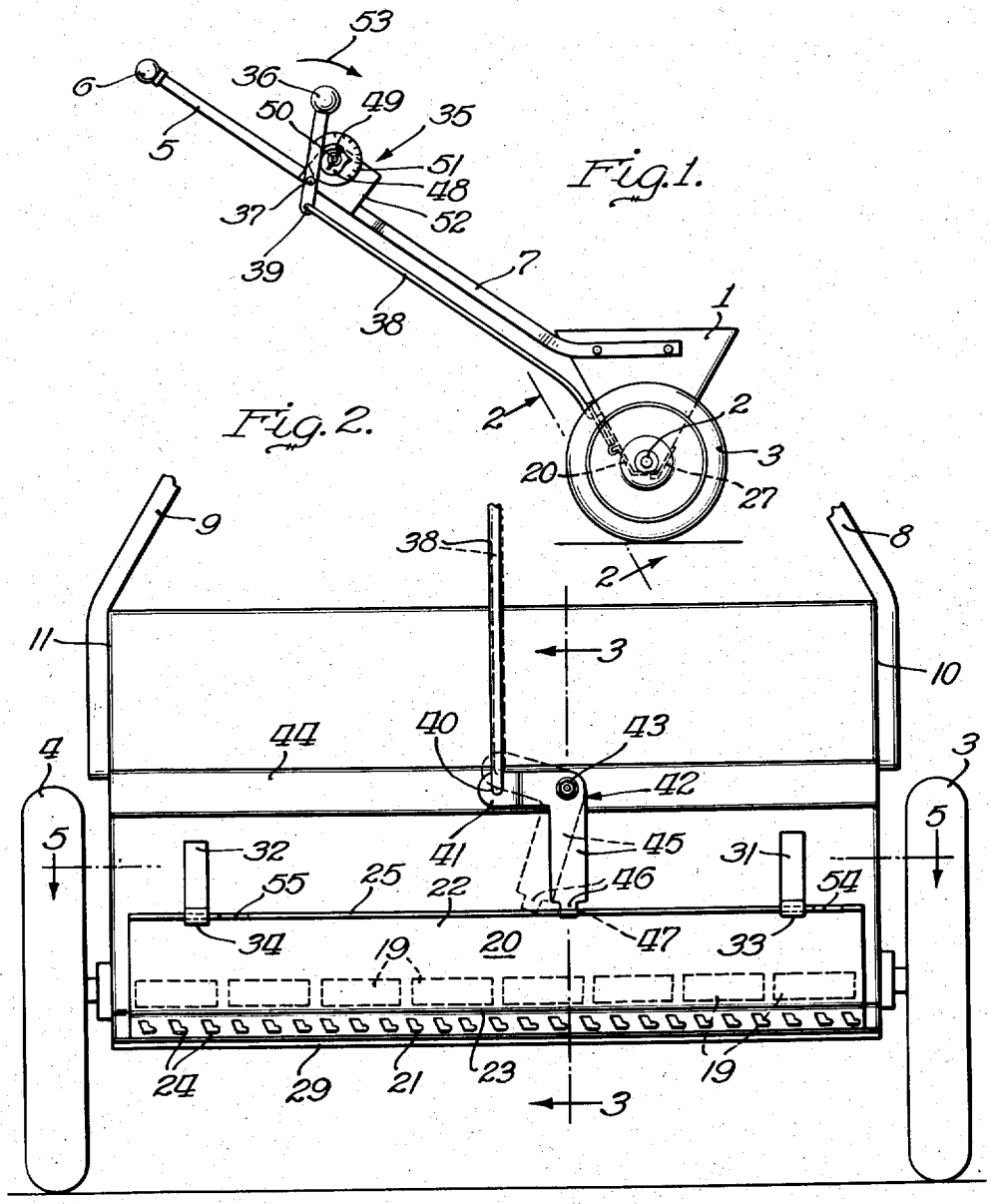
Inventors:
Joseph H. Masters
Lewis W. Lawrence
Edwin L. Masters
By: Eberhard E. Wittley Atty.

FEED CONTROL MECHANISM FOR MATERIAL SPREADERS

Original Filed April 20, 1955 4 Sheets-Sheet 2

Inventors:
Joseph H. Masters
Lewis W. Lawrence
Edwin L. Masters

By: Eberhard E. Wolfley
Atty.

FEED CONTROL MECHANISM FOR MATERIAL SPREADERS

Original Filed April 20, 1955 4 Sheets-Sheet 3

Inventors:
Joseph H. Masters
Lewis W. Lawrence
Edwin L. Masters

By: Eberhard E. Worley
Atty.

FEED CONTROL MECHANISM FOR MATERIAL SPREADERS

Original Filed April 20, 1955 4 Sheets-Sheet 4

Inventors:
Joseph H. Masters
Lewis W. Lawrence
Edwin L. Masters
By: Eberhard E. Wolff Atty.

United States Patent Office

Re. 24,622

Reissued Mar. 17, 1959

24,622

FEED CONTROL MECHANISM FOR MATERIAL SPREADERS oseph H. Masters, Lewis W. Lawrence, and Edwin L. Masters, Benton Harbor, Mich., assignors, by mesne assignments, to Jackson Manufacturing Company, Harrisburg, Pa., a corporation of Pennsylvania riginal No. 2,796,203, dated June 18, 1957, Serial No. 502,676, April 20, 1955. Application for reissue March 20, 1958, Serial No. 726,303

27 Claims. (Cl. 222—311)

Matter enclosed in heavy brackets [ ] appears in the riginal patent but forms no part of this reissue specifiation; matter printed in italics indicates the additions nade by reissue.

This invention relates to a material spreader contructed and arranged for the distribution of fertilizers, round treatment materials, and seeds or the like.

More specifically the material spreader of the present nvention is directed to a new design of valve arrangeent for the material to enhance the use of the device, reatly increasing its range of utility to provide the proper neans for spreading substances that may be powdery in orm or extremely coarse in nature.

It is one of the objects of the present invention to rovide a material spreader having a dual valve, the rrangement being situated in the feed portion of the opper of the spreader and in proximity to the movable gitator which operates to move the material out of the penings thereof.

Another object of the present invention is to provide single valve plate which is directly arranged to coact ith the dual opening feed structure of the hopper and hich plate is quickly removable under certain condiions of operation to obtain a variation in the discharge f the material being distributed. Incidentally, the plate emoval also is advantageous when it comes to cleaning e valve mechanism and the discharge openings in the opper.

Another object of the present invention is directed to operative mechanisms whereby the valve plate can be ifted to regulate the feed through the hopper openings the use of a control mechanism similar to that shown d described in the Edwin L. Masters Patent No. 626,083, issued January 20, 1953. In this connection e control mechanism provides an advantageous maxium regulation of the valve plate between a fully closed sition of the hopper openings to a fully open position ereof and wherein part of the control mechanism may easily removed to permit additional shifting of the lve plate into a drop-off position.

Other objects of the present invention relate to the e of a single valve plate cooperatively arranged in relaon with two sets of feed openings in the hopper to gulate the material discharged through at least one of e sets of openings and to render the other set of opengs inoperative; the use of the foregoing defined dual rt and valve plate with an additional or supplemental te valve for the regulation of the normally closed enings when rendered operative by the removal of the ding valve member; and also an advantageous arrangeent of openings wherein at least one set of openings is rmed in a predetermined configuration to obtain an adntageous feed regulation of the specific material being stributed as shall hereinafter be more fully explained. Other objects and advantages relating to the material reader of the present invention shall hereinafter be scribed in greater detail in connection with the accomnying drawings disclosing a preferred embodiment of the invention together with several modifications thereof and which drawings form a part of this specification.

In the drawings:

Figure 1 is a side elevational view of a material spreader incorporating the new and novel features of the present invention;

Figure 2 is a rear elevational view of the hopper portion of the spreader illustrated in Figure 1 and as viewed substantially from along the line 2—2 therein;

Figure 3:
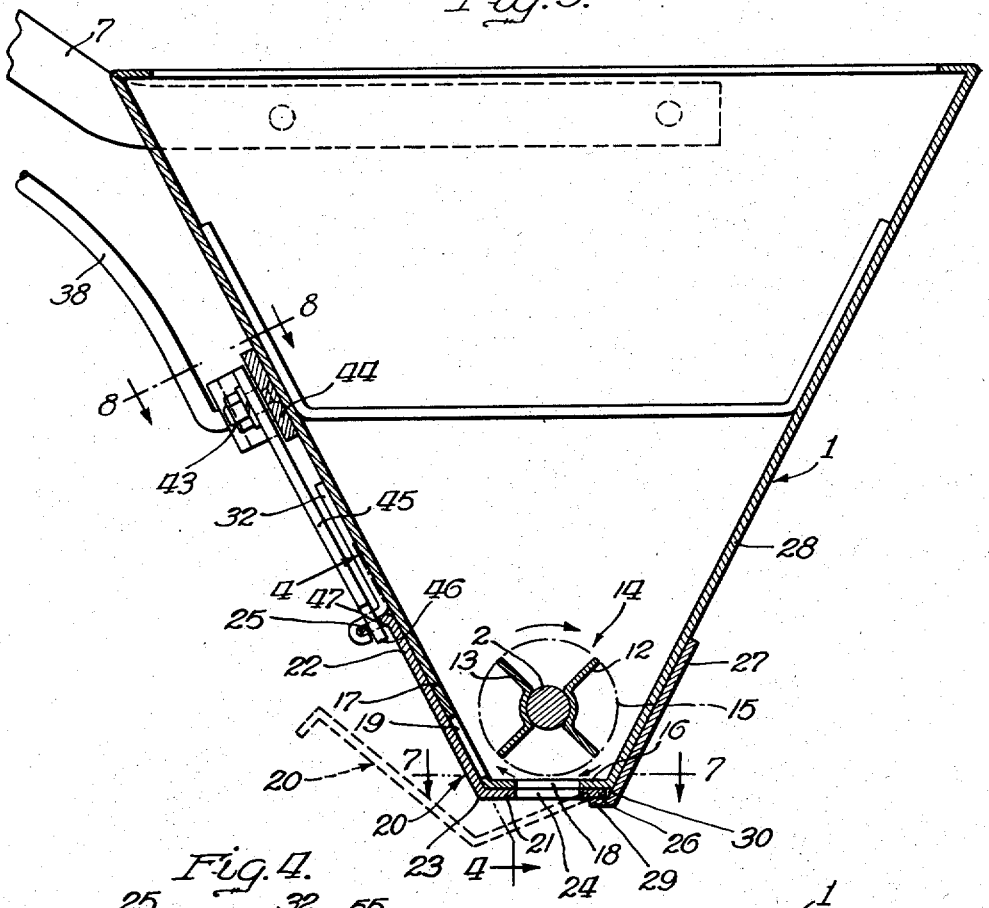
Figure 3 is a transverse vertical cross sectional view through the hopper of the material spreader substantially as viewed in the plane of the line 3—3 in Figure 2.
Figure 4:
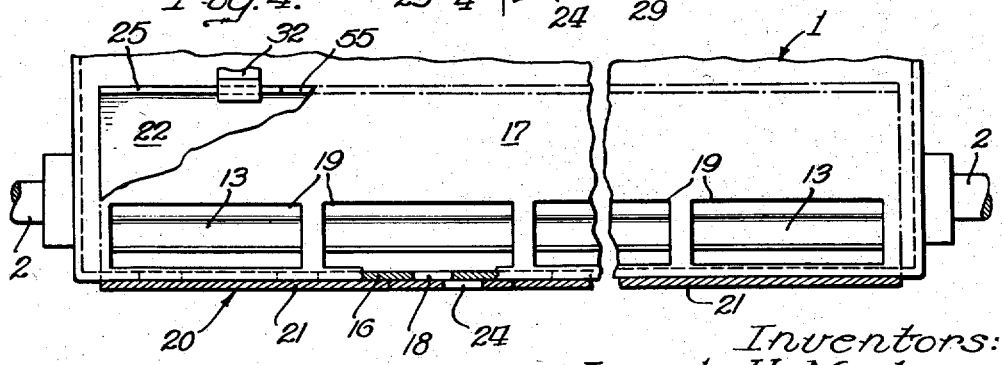
Figure 4 is a fragmentary cross sectional view of the valve mechanism of the hopper of the material spreader substantially as seen along the plane of the line 4—4 in Figure 3.

Figures 1 to 7 are directed to a preferred construction of valving means incorporated into a material spreader designed according to the principles of the present invention. In Figure 1, the spreader primarily consists of a hopper 1 mounted upon an axle 2 which axle is carried upon wheels 3 and 4 to provide the mobile means for pushing the spreader over a surface or ground by means of a handle 5 having a hand grip 6, the handle having a forked end 7 which is divided into the two hopper engaging legs 8 and 9 that are secured to the side walls 10 and 11 of the hopper.

As seen in Figure 3, the shaft 2 is provided with agitating vane members 12 and 13 and rotate in the same direction as the revolution of the wheels 3 and 4 as the spreader is moved forwardly. The agitator shown in its entirety at 14 thus describes a suitable arc such as shown in dot and dash lines at 15 in Figure 3 wherein the vanes or blades of the agitator move rearwardly and across the bottom or bottom wall 16 of the agitator hopper 1 and the same vanes operate along this broken line 15 in a rearwardly and upwardly fashion adjacent the rear wall 17 of the hopper 1.

The agitator bottom 16 is provided with a plurality of ports or openings 18 and the rear wall 17 of the agitator hopper 1 is further provided with a plurality of ports or openings 19 thus providing two sets of spaced openings 18 and 19 which extend transversely along the bottom of the hopper and the rear side thereof and which openings are cooperatively related to the agitator so that the revolutions of the latter will generally feed material to the bottom openings 18 causing the material to drop by gravity therethrough and throughout the length of the openings and the same agitator moves material rearwardly and partially lifts the same to directly push such material out of the set of openings 19 when this latter feed is desirable and as determined by the valving mechanism to be described.

The valve mechanism comprises primarily a single plate 20 which extends longitudinally along the rearward and outward corner of the hopper 1 and this plate is formed in two legs or sections 21 and 22 meeting at an angle or point such as 23 to form a very rigid and inelastic structure which is efficient and certain in operation as a valving unit. The leg section 21 is disposed in coplanar relation below the bottom 16 of the hopper 1, and this leg includes a plurality of ports or openings 24 which are constructed and arranged for valving cooperation with the ports 18 in the bottom 16 of the hopper 1.

The other section 22 of the valve plate 20 is angled to provide a coincident engagement in the plane of the rear wall 17 of the hopper 1, and this portion of the valve plate 20 terminates in an outwardly disposed flange 25 which also extends the length of the plate structure.

The forward longitudinal edge 26 of the leg 21 of the valve plate 20 is supported for sliding movement by means of a flat bracket 27 which is rigidly secured to the forward wall 28 of the hopper 1 and which depends downwardly with respect to the outer surface of the hopper bottom 16 to terminate in a ledge or flange 29 forming a suitable groove 30 for the reception of the outer edge 26 of the valve plate 20.

Referring now more particularly to Figures 2 and 3, the rear portion of the valve plate 20 is held in cooperative sliding engagement with the bottom of the hopper by means of clips 31 and 32 that are secured to the rear wall 17 of the hopper 1 and which conclude with reentrant portions 33 and 34 that hook over the flange 25 of the valve plate 20 and hold the plate in its operative sliding engagement against the hopper walls 16 and 17 as previously described.

In the construction illustrated it should be noted that the feed of material out of the hopper 1 is primarily controlled by sliding the plate 20 relative to the hopper and with the plate in its operative engagement with the hopper, the regulation of the quantity of material fed through the openings is confined to the openings 18 and 24 since the openings 19 are closed by the leg 22 of the plate 20. This arrangement provides a certain range of feed that is generally confined to extremely fine and powdery materials and to some of the more finer and divided granular materials which may be distributed by the spreader as determined by the minimum and maximum capacities of the openings 18 and 24 in the bottom of the hopper 1.

Figure 5:
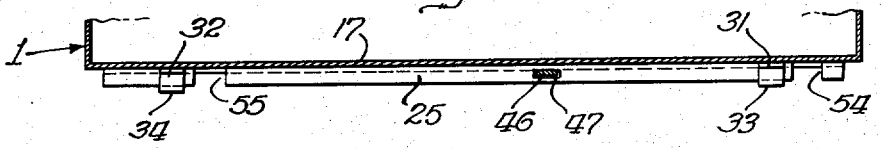
Figure 5 is a detailed cross sectional view taken through a portion of the hopper substantially as viewed along the line 5—5 in Figure 2.

Londitudinal actuation of the sliding plate 20 is accomplished by means of a control mechanism 35 connected with the handle 5 and which generally follows the construction of the calibrated fertilizer spreader adjustment shown and described in the Edwin L. Masters Patent No. 2,626,083 issued January 20, 1953. Briefly, this mechanism includes a control handle 36 which is pivoted at 37 to the handle 5 and which includes a link 38 pivotally carried in the end 39 of the control handle 36 and pivotally connected at 40 with the leg 41 of a bell crank 42. This bell crank is pivoted at 43 to the hopper 1 and more specifically to a cross brace 44 and includes a depending leg 45 that terminates with an ear 46 and operates through an opening 47 provided in the flange 25 of the sliding plate 20 as best illustrated in Figures 2 and 5. Thus, movement of the handle 36 about its pivot 37 will establish a sliding movement of the plate 20 in the long direction of the hopper.

The amount of movement of the plate 20 relative to the hopper can be controlled by various mechanisms, but according to the construction of the unit 35 a cam 48 is connected by means of a thumb screw 49 and screw 50 to a calibrated disc 51 which is secured to a bracket 52 on handle 5. Thus by changing the angular positions of the cam 48, it is possible for the operator to move the control handle 36 downwardly against the cam in the direction of the arrow 53 as shown in Figure 1 to establish a predetermined opening or feed relationship between the ports 18 and 24 in the bottom of the hopper. The calibrations on the disc 51 establish the range of the movement of the plate 20 from a full port closing position to a full port open position, thus moving the plate 20 between two maximum positions in either direction to obtain this range of material feed.

In order to increase the feed of material over and above that which can be discharged through openings or ports 18 and 24 when superimposed, it is possible to drop off the plate 20, thus exposing the openings 19 in the rear wall 17 of the hopper 1. To accomplish this latter function, the flange 25 of the plate 20 is provided with spaced slots such as 54 and 55 which may be brought into aligned positions with the clips 31 and 32 permitting the plate 20 to drop off as shown in dotted lines in Figure 3. Since the cam 48 prevents movement of the plate into the drop-off position which is a feature that prevents the accidental release of the plate, it is necessary to remove the thumb screw 49 from the screw 50 to remove the cam 48 which will then permit the handle 36 to be moved in the direction 53 an additional amount to bring the slots 53 and 54 in flange 25 in line with the clips 31 and 32 permitting the plate to be removed for establishing the greater material feed relationship of the hopper utilizing both the openings of ports 18 and 19.

Figure 6:
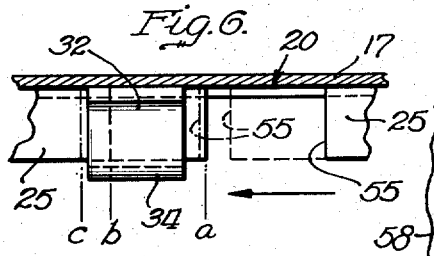
Figure 6 is an enlarged detailed cross sectional view of one of the valve plate supporting arrangements.

As shown in Figure 6, lines a and z determine the normal longitudinal movement of the plate 20 for controlling the amount of the openings of the ports 18 as determined by the surface portions of the cam 48, while the line c establishes the additional relationship necessary to move the plate 20 into a drop-off position by the removal of the cam as described. With the removal of the valving plate 20 the agitator and hopper combination can now be adapted for feeding out very coarse granular or straw-like materials which could not normally be distributed by a material spreader of this type. Thus the range of the spreader can be set to extend from the distribution of fine powdery materials such as slack lime on up to extremely coarse materials as may be represented by steer manure.

Figure 7:
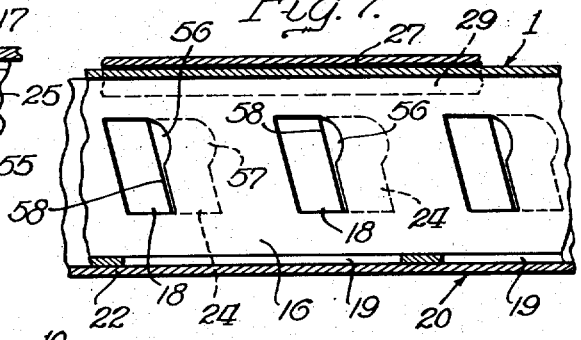
Figure 7 is a fragmentary plan view taken substantially along the plane of the line 7—7 in Figure 3 to illustrate details of the feed discharge openings formed in the hopper.

Referring more specifically to Figure 7, it should be noted that the openings or ports 18 in the bottom 16 of the hopper 1 are each formed with a P configuration and that these openings are also generally sloped in the direction as indicated in Figure 7. The openings or ports 24 in the sliding plate 20 are also of the same configuration as the ports 18 so that each of the ports 18 and 24 include generally semi-circular offset feed apertures 56 and 57 which are alike to provide a full open port as the valve plate 20 is moved for opening alignment.

However, when an extremely small amount of material is to be fed out of the hopper, the edges 58 of the plate openings 24 will now provide a larger and more concentrated fine feed aperture as defined by the openings as shown in Figure 7 and in the positions in which they are shown which will accommodate the light feed function of the spreader. Formerly, the opening of the two cooperating ports would provide a long thin edge or space which would still prevent the feed of certain materials that should be fed lightly but which may not fall through such a crevice. By providing the P-shaped openings having the concentrated aperture portions 56, it is possible to feed finer materials and lighter quantities. For example, grass seed would be difficult to feed finely through long crevices or openings, whereas this same grass seed would feed properly out of a bulbous opening such as shown at 56—56 in Figure 7.

Figure 9:
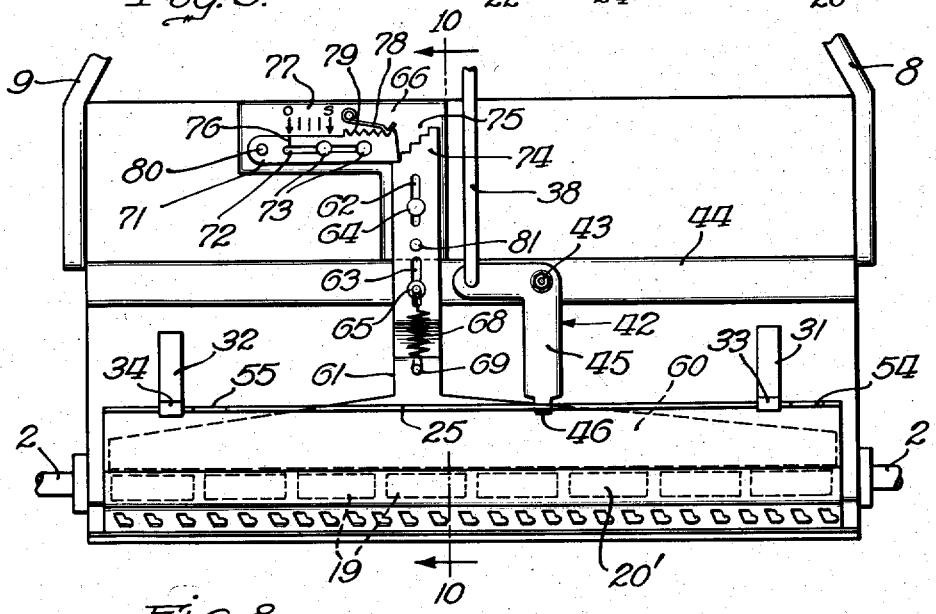
Figure 9 is a rear elevational view of the hopper portion of a material spreader illustrating a modified construction thereof.
Figure 8:
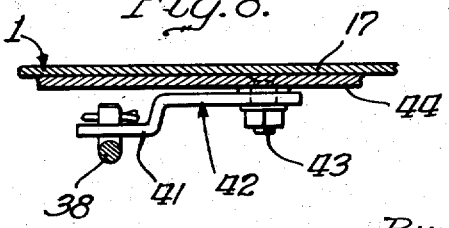
Figure 8 is a fragmentary sectional view taken substantially along the line 8—8 in Figure 3 to illustrate further details of the valve plate operating mechanism.
Figure 10:
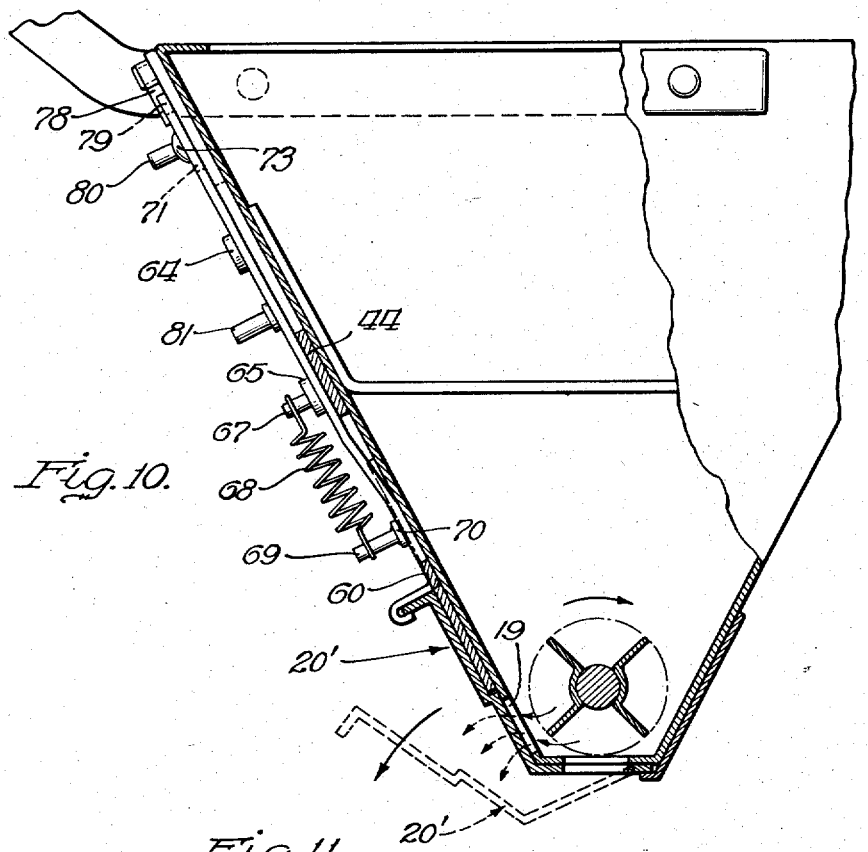
Figure 10 is a vertical transverse cross sectional view taken substantially along the plane of the line 10—10 in Figure 9 to illustrate further details of construction of this modified arrangement.

Referring now to the modified form of the invention shown in Figures 9 and 10, the hopper here illustrated includes a slidable gate valve 60 which is held in stored position in back of an offset valve plate 20' and which can be brought into place after the valve plate 20' has been removed from the hopper in the same manner as previously described. The gate valve 60 is provided with an elongated extension 61 containing slots 62 and 63 slidable upon the fixed studs 64 and 65 that are secured to a reinforcing plate 66 and the hopper brace plate 44, respectively. Stud 65 includes an extension 67 to carry one end of a spring 68 that is secured over the pin 69 secured at 70 to the vertical leg or extension 61 of the gate valve 60. With this spring arrangement the gate valve is normally held upwardly in the position shown in Figures 9 and 10 and as determined by the latch bar 71 slidably carried by means of the slot 72 and fixed pins 73 against the plate 66.

By providing the upper end 74 of the extension or arm 71 with notches 75, it is possible to bring the latch 71 into engagement with various ones of the notches to obtain a predetermined clearance opening of the ports or openings 19 if and when an operator desires to drop off the plate 20' to obtain a greater feed of a more granulated material.

The latch member may be suitably marked or provided by indicia such as the line 76 which may be brought into different positions with respect to the graduations 77 and is further aided or determined by means of a spring 78 that engages in suitable notches such as 79 carried in the latch member 71. For ease of moving the latch member 71 a suitable pin such as 80 may be provided on this unit, and similarly a pin such as 81 may be provided on the tail piece or extension 61 of the gate 60.

Figure 11:
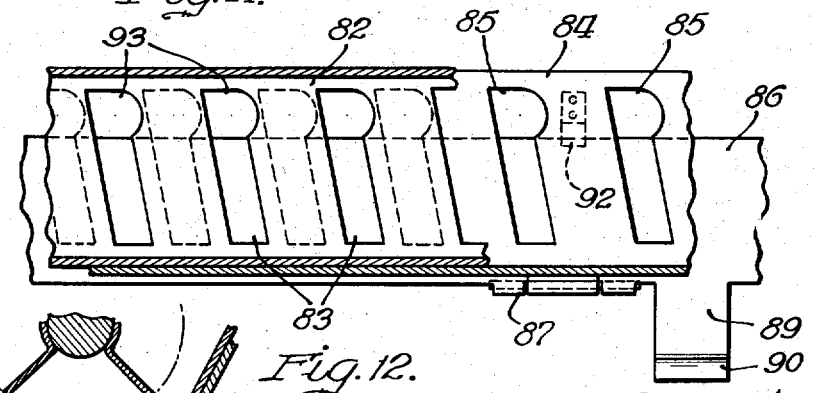
Figure 11 is a plan sectional view substantially in the plane of a hopper bottom to illustrate another modified arrangement of material discharge openings of the valve structure associated therewith.
Figure 12:
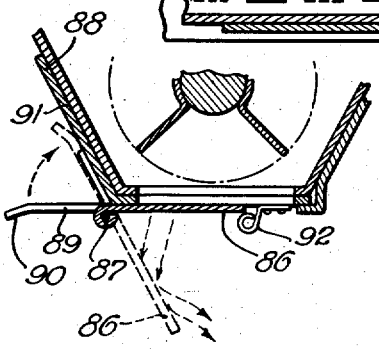
Figure 12 is a detailed vertical cross sectional view taken substantially transversely of the Figure 11 illustration to show additional details of construction of this latter design.

Another modification of a feed arrangement is best illustrated in Figures 11 and 12 wherein the hopper bottom 82 is provided with P-shaped slots 83 for the discharge of material while the sliding valve plate 84 contains a similar P-shaped material feed opening such as 85 which cooperates directly with the openings or ports 83.

In this particular arrangement, however, the side slots or openings such as 19 have been eliminated by providing greater quantity feed openings in the bottom of the hopper and the dual regulation may be accomplished by means of a baffle such as 86 which is suitably pivoted at 87 to a valve plate 88 which is similar to the plates 20 and 20' previously described.

The baffle 86 is provided with one or more finger grip extensions such as 89 having deflecting or bent ends 90 for finger grip purposes, and these extensions also form stop means to contact the rear side of the upwardly extending leg 91 of the valve plate 88 to position the baffle 86 in a position as illustrated in dotted lines in Figure 12 when a total opening of the ports is desired. If the particular material being fed or conditions of operation warrant a smaller cooperative port arrangement, the baffle plate 86 may be swung into a latched position against one or more spring clips such as 92 that are secured to the underside of the valve plate 88.

With the latter arrangement it is, therefore, possible to use a sliding valve member which may normally function for opening and closing the ports in the hopper and which need not be removed to obtain the larger quantity discharge areas that were previously supplied by the rearward openings such as 19 in the wall 17 of the hopper. By using the control means such as 35 shown in Figure 1 to slidably operate the plate 88, it is possible to maintain a variation in the amount of material discharged from the smaller open portions such as 93 in the P ends of the P slots while a similar regulation of material discharge in greater quantities is possible with the dropping of the baffle plate 86 to greatly extend the usefulness and efficiency of the spreader as well as the range of material that may be spread thereby.

The foregoing description has been directed to a preferred embodiment of the invention together with several modified constructions thereof. It is, however, contemplated that certain changes may be made in those particular designs both as to the combination of elements used and in the elements per se without departing from the fundamental concept of the present invention.

All such changes and modifications shall, however, be governed by the breadth and scope of the claims directed to the invention.

What we claim is:

[1. In a material spreader, a material carrying hopper having a bottom wall and upwardly extending peripheral walls leading therefrom, said bottom wall having one set of material feed openings formed therein, one of said peripheral walls having another set of material feed openings formed therein, and a slidable apertured valve plate having wall portions thereof coincidentally arranged in the planes of the walls having said feed openings and comprising means to control the material feed through such openings.]

2. In a material spreader, a material carrying hopper having a bottom wall and upwardly extending peripheral walls leading therefrom, said bottom wall having one set of material feed openings formed therein, one of said peripheral walls having another set of material feed openings formed therein, and a slidable valve plate having wall portions thereof coincidently arranged in the planes of the wall having said feed openings and comprising means to control the material feed through such openings, said valve plate having apertures in one wall portion thereof to coact with one of the sets of openings in said hopper, the other wall portion of said valve plate providing a cover for the other set of openings in said hopper, and cooperative *holding and* release members carried by said valve plate and by certain of said hopper walls to permit displacement of said valve plate to establish material feed through said previously covered set of wall openings of said hopper.

3. In a material spreader, a material carrying hopper having a bottom wall and upwardly extending peripheral walls leading therefrom, said bottom wall having one set of material feed openings formed therein, one of said peripheral walls having another set of material feed openings formed therein, and a slidable valve plate having wall portions thereof coincidentally arranged in the planes of the walls having said feed openings and comprising means to control the material feed through such openings, said valve plate having apertures in one wall portion thereof to coact with one of the sets of openings in said hopper, and the other wall portion of said valve plate providing a cover for the other set of openings in said hopper, and guide means on said hopper to carry said valve plate for sliding movement for the regulation of the material feed discharge from said hopper and including *holding and* releasable means for the *holding and* selective removal of said plate to completely uncover both sets of said hopper openings.

4. In a material spreader, a material carrying hopper having a bottom wall and upwardly extending peripheral walls leading therefrom, said bottom wall having one set of material feed openings formed therein, one of said peripheral walls having another set of material feed openings formed therein, and a slidable valve plate having wall portions thereof coincidentally arranged in the planes of the walls having said feed openings and comprising means to control the material feed through such openings, said valve plate having apertures in one wall portion thereof to coact with one of the sets of openings in said hopper, and the other wall portion of said valve plate providing a cover for the other set of openings in said hopper, and guide means on said hopper to carry said valve plate for sliding movement for the regulation of the material feed discharge from said hopper and including *holding and* releasable means for the *holding and* selective removal of said plate to completely uncover both sets of said hopper openings, said hopper having an auxiliary gate valve adapted for valving one of the sets of openings in said hopper and rendered operative upon removal of the slidable valve plate.

5. In a material spreader, a material carrying hopper having a bottom wall and upwardly extending peripheral walls leading therefrom, said bottom wall having one set of material feed openings formed therein, one of said peripheral walls having another set of material feed openings formed therein, and a slidable valve plate having wall portions thereof coincidently arranged in the planes of the walls having said feed openings and comprising means to control the material feed through such openings, said valve plate having apertures in one wall portion thereof to coact with one of the sets of openings in said hopper, and the other wall portion of said valve plate providing a cover for the other set of openings in said hopper, and guide means on said hopper to carry said valve plate for sliding movement for the regulation of the material feed discharge from said hopper and including *holding and* releasable means for the *holding and* selective removal of said plate to completely uncover both sets of said hopper openings, and manual control mechanism carried upon said spreader and connected with said valve plate to actuate the latter between predetermined limits of minimum and maximum hopper material discharge positions with respect to the hopper openings, said control mechanism including means to permit additional shifting of said plate into a drop-off position.

6. A material spreader comprising a hopper having discharge openings, a valve plate having openings arranged for coaction with said hopper openings, guide mechanism on said hopper to slidably carry said plate including coacting means on said mechanism and plate to provide a plate *holding position and a plate* release position, and a control unit on said spreader connected to shift said plate relative to said guide mechanism, said control unit providing a regulator means to limit the movement of said plate between fully closed and fully open positions relative to said hopper openings, and regulator release means to permit additional sliding movement of said valve plate into its plate release position.

7. A material spreader comprising a hopper having discharge openings, a valve plate having openings arranged for coaction with said hopper openings, guide mechanism on said hopper to slidably carry said plate including coacting means on said mechanism and plate to provide a plate *holding position and a plate* release position, and a control unit on said spreader connected to shift said plate relative to said guide mechanism, said control unit providing a regulator means to limit the movement of said plate between fully closed and fully open positions relative to said hopper openings, and regulator release means to permit additional sliding movement of said valve plate into its plate release position, said guide mechanism comprising a guide strip for one edge of said plate, spaced clip members for the opposite edge of said plate, and said opposite plate edge having spaced notches arranged to release said plate upon alignment of said notches and clip members.

8. A material spreader hopper having a bottom wall with front, back and side walls extending upwardly therefrom, a first set of material discharge ports in said hopper bottom and a second set of material discharge ports in said rear hopper wall and disposed adjacent said hopper bottom, and a rotary agitator in said hopper operating adjacent said ports, and means to drive said agitator to revolve in a direction to sweep over and rearwardly across the bottom hopper wall ports to drop material therethrough and to sweep rearwardly and upwardly across the rear wall ports to bodily lift and push hopper material out of said rear wall ports.

9. A material spreader hopper having a bottom wall with front, back and side walls extending upwardly therefrom, a first set of material discharge ports in said hopper bottom and a second set of material discharge ports in said rear hopper wall and disposed adjacent said hopper bottom, and a rotary agitator in said hopper operating adjacent said ports, and means to drive said agitator to revolve in a direction to sweep over and rearwardly across the bottom hopper wall ports to drop material therethrough and to sweep rearwardly and upwardly across the rear wall ports to bodily lift and push hopper material out of said rear wall ports, and an apertured slidable valve carried by said hopper to regulate the material discharge through said ports comprising an angle plate having one leg disposed in the plane of the hopper bottom and another leg disposed in the plane of the rear hopper wall.

10. A material spreader hopper having a bottom wall with front, back and side walls extending upwardly therefrom, a first set of material discharge ports in said hopper bottom and a second set of material discharge ports in said rear hopper wall and disposed adjacent said hopper bottom, and a rotary agitator in said hopper operating adjacent said ports, and means to drive said agitator to revolve in a direction to sweep over and rearwardly across the bottom hopper wall ports to drop material therethrough and to sweep rearwardly and upwardly across the rear wall ports to bodily lift and push hopper material out of said rear wall ports, and an apertured slidable valve carried by said hopper to regulate the material discharge through said ports comprising an angle plate having one leg disposed in the plane of the hopper bottom and another leg disposed in the plane of the rear hopper wall, said plate apertures being formed in one of said plate legs with the other plate leg being solid, and *holding and* releasable means to permit bodily removal of said plate, and an auxiliary gate valve carried by said hopper to regulate material discharge through one set of said hopper ports rendered operable by the removal of said plate.

11. A material spreader hopper having a bottom wall with front, back and side walls extending upwardly therefrom, a first set of material discharge ports in said hopper bottom and a second set of material discharge ports in said rear hopper wall and disposed adjacent said hopper bottom, and a rotary agitator in said hopper operating adjacent said ports, and means to drive said agitator to revolve in a direction to sweep over and rearwardly across the bottom hopper wall ports to drop material therethrough and to sweep rearwardly and upwardly across the rear wall ports to bodily lift and push hopper material out of said rear wall ports, and an apertured slidable valve carried by said hopper to regulate the material discharge through said ports comprising an angle plate having one leg disposed in the plane of the hopper bottom and another leg disposed in the plane of the rear hopper wall, said plate apertures being formed in one of said plate legs with the other plate leg being solid, and releasable *holding* means to *hold and* permit bodily removal of said plate, and an auxiliary gate valve carried by said hopper to regulate material discharge through one set of said hopper ports rendered operable by the removal of said plate, and cooperative detent mechanism carried by said hopper and said auxiliary gate valve to provide for predetermined settings of said gate valve in respect to the ports controlled thereby.

12. A material spreader hopper having a bottom wall with front, back and side walls extending upwardly therefrom, a first set of material discharge ports in said hopper bottom and a second set of material discharge ports in said rear hopper wall and disposed adjacent said hopper bottom, and a rotary agitator in said hopper operating adjacent said ports, and means to drive said agitator to revolve in a direction to sweep over and rearwardly cross the bottom hopper wall ports to drop material therethrough and to sweep rearwardly and upwardly across the rear wall ports to bodily lift and push hopper material out of said rear wall ports, and a movable apertured valving plate coacting with one of the sets of ports to regulate the amount of feed opening therethrough, said openings in said one set each having a P-shaped outline comprising a slotted section and an offset curved section formed outwardly to one side of the slotted section, and said valving plate apertures providing a straight edge portion arranged to initially open said offset curved section of said P-shaped openings followed by the opening of the slotted sections thereof.

13. A valving mechanism for a material spreader and in combination with a walled hopper having material discharge ports in the bottom portion thereof, a valving plate slidably mounted upon said hopper and in operative relation with respect to said ports, said plate comprising an elongated element having one leg section arranged in the plane of the hopper bottom and another leg section arranged in the plane of one upwardly extending wall of said hopper, and a ledge member on said hopper arranged to guidedly carry the long outer edge of one of said leg sections, said other leg section having a flange along its elongated outer edge, and clip members on said hopper to slidably support said flange, said flange including outwardly extended slots spaced as said clips to permit *holding of said valve plate and* bodily release of said valve plate upon alignment of said clips and slots.

14. A valving mechanism for a material spreader and in combination with a walled hopper having material discharge ports in the bottom portion thereof, a valving plate slidably mounted upon said hopper and in operative relation with respect to said ports, said plate comprising an elongated element having one leg section arranged in the plane of the hopper bottom and another leg section arranged in the plane of one upwardly extending wall of said hopper, and a ledge member on said hopper arranged to guidedly carry the long outer edge of one of said leg sections, said other leg section having a flange along its elongated outer edge, and clip members on said hopper to slidably support said flange, said flange including outwardly extended slots spaced as said clips to permit *holding of said valve plate and* bodily release of said valve plate upon alignment of said clips and slots, one of said leg sections having ports formed for coaction with said hopper ports, and a swingable baffle pivotally mounted upon said valve plate to cover the ports of said hopper and ported leg section when said baffle is disposed in one position, and arranged to swing to another position away from said latter ports to permit full material discharge through said ports, said baffle providing material deflecting means when disposed in said latter position.

15. A valving mechanism for a material distributor comprising a hopper having material discharge ports, a plate slidably carried by said hopper and operating in the plane of the hopper surface having said discharge ports, said plate having port matching apertures formed therethrough, and said hopper ports and said plate apertures each having P-shaped configurations with the straight sided edges of the openings of one group arranged to initially coact directly with the curved projecting parts of the head portion of the P-shaped openings of the other group.

16. A valving mechanism for a material distributor comprising a hopper having material discharge ports, a plate slidably carried by said hopper and operating in the plane of the hopper surface having said discharge ports, said plate having port matching apertures formed therethrough, and said hopper ports and said plate apertures each having P-shaped configurations with the straight sided edges of the openings of one group arranged to initially coact directly with the curved projecting parts of the head portion of the P-shaped openings of the other group, and a movable baffle arranged to selectively block off certain portions of both groups of said coacting P-shaped openings under certain conditions of operation.

17. A valving mechanism for a material distributor comprising a hopper having material discharge ports, a plate slidably carried by said hopper and operating in the plane of the hopper surface having said discharge ports, said plate having port matching apertures formed therethrough, and said hopper ports and said plate apertures each having P-shaped configurations with the straight sided edges of the openings of one group arranged to initially coact directly with the curved projecting parts of the head portion of the P-shaped openings of the other group, and a movable baffle arranged to selectively block off certain portions of both groups of said coacting P-shaped openings under certain conditions of operation, and control mechanism connected with said plate to actuate the latter into different positions relative to said hopper to thereby suitably stagger said two sets of openings to obtain a predetermined material discharge further subjected to the relative positions of said baffle.

18. A feed structure for a hopper of a material spreader comprising at least two relatively movable wall portions on said hopper, coacting apertures formed in said wall portions respectively and adapted to discharge material from within said hopper, said wall portion apertures comprising matched rectilinear sections including matched and similarly located semi-circular offset portions contiguous with said rectilinear sections, and means to actuate said relatively movable wall portions in a given relation with respect to each other to cause said apertures to function.

19. In a feed structure of the character set forth and defined in claim 18, but wherein certain of the adjacent straight edges of one set of apertures in one wall portion initially coact directly with the semi-circular offset portions of the apertures in said other of said sets of apertures prior to feed control coaction between the rectilinear sections of said apertures during the actuation of said wall portions for coincident registry of said apertures in said wall portions.

20. In a feed structure of the character set forth and defined in claim 18, but wherein a baffle plate is carried by said hopper and arranged to cover a predetermined portion of said coacting apertures to restrict the overall regulated flow of material through said apertures.

21. In a structure as in claim 20, but wherein releasable cooperative orientation means are provided on said hopper for said baffle and to permit displacement of said baffle out of material flow restrictive engagement with said coacting wall portion apertures.

22. A valving mechanism for a material distributor comprising a walled material carrying hopper having a bottom with at least one of the hopper walls extending upwardly from said bottom, said bottom having one set of feed openings therein and said one wall having another set of feed openings formed therein flanking the bottom to provide material discharge laterally outwardly from said bottom, a material agitator arranged to move hopper material in a direction across the bottom apertures and laterally outwardly through the openings of said one wall, and valving means coacting with each of said sets of openings to regulate material discharge comprising a first bodily displaceable valve plate coacting with one set of openings, a second valve plate coacting with the other of said sets of of openings, said displaceable plate rendering the other of said plates inactive to provide one predetermined material feed range, said inactive plate providing another predetermined material feed range upon bodily displacement of said first valve plate.

23. In a valving mechanism as defined in claim 22 but wherein the openings in each of the sets are aligned and positioned along the length of the hopper, and wherein regulatory actuating means is connected to move one of said valve plates along the direction of said aligned openings, and wherein other regulatory actuating means is connected to move the other of said valve plates in a direction angularly disposed with respect to the aligned openings of said sets.

*24. A material spreader for distributing fertilizers, ground treatment materials and seeds and the like, comprising: a hopper having a bottom wall with front, back and side walls extending upwardly therefrom, a first set of material discharge ports in said bottom wall and a second set of material discharge ports in one of said front and back walls and disposed adjacent said bottom wall, means to close, or not close, said second set of discharge ports, whereby when said second set of discharge ports are not closed, to increase the discharge of material from said hopper over and above that which can be discharged through said first set of discharge ports, and when said second set of discharge ports are closed to reduce the discharge of material from said hopper to that which can be discharged through said first set of discharge ports, a rotary agitator in said hopper operating adjacent said ports, and means to drive said agitator to revolve in a direction to sweep over and across the bottom hopper wall ports to drop material therethrough and to sweep across the second set of material discharge ports to push hopper material out of said second set for ports.*

*25. A material spreader for distributing fertilizers, ground treatment materials and seeds and the like, comprising: a hopper having a bottom wall with front, back and side walls extending upwardly therefrom, a first set of material discharge ports in said bottom wall and a second set for material discharge ports in one of said front and back walls and disposed adjacent said bottom wall, means to close, or not close, said second set of discharge ports, whereby when said second set of discharge ports are not closed, to increase the discharge of material from said hopper over and above that which can be discharged through said first set of discharge ports and when said second set of discharge ports are closed to reduce the discharge of material from said hopper to that which can be discharged through said first set of discharge ports, a rotary agitator in said hopper operating adjacent said ports, means to drive said agitator to revolve in a direction to sweep over and cross the bottom hopper wall ports to drop material therethrough and to sweep across the second set of material discharge ports to push hopper material out of said second set of ports, and valve plate means having a wall portion thereof for occupying position against said hopper bottom and adapted for movement with respect to said hopper bottom to control the discharge of material through said first set of material discharge ports.*

*26. A material spreader for distributing fertilizers, ground treatment materials and seeds and the like, comprising: a hopper having a bottom wall with front, back and side walls extending upwardly therefrom, a first set of material discharge ports in said bottom wall and a second set of material discharge ports in one of said front and back walls and disposed adjacent said bottom wall, means to close, or not close, said second set of discharge ports, whereby when said second set of discharge ports are not closed, to increase the discharge of material from said hopper over and above that which can be discharged through said first set of discharge ports and when said second set of discharge ports are closed to reduce the discharge of material from said hopper to that which can be discharged through said first set of discharge ports, a rotary agitator in said hopper operating adjacent said ports, valve plate means having a wall portion thereof for occupying position against said hopper bottom and adapted for movement with respect to said hopper bottom to control the discharge material through said first set of material discharge ports, and manual control mechanism carried on said spreader and connected to said valve plate means to actuate, from position remote from said hopper bottom, said wall portion of said valve plate means between minimum and maximum hopper material discharge positions.*

*27. A material spreader for distributing fertilizers, ground treatment materials and seeds and the like, comprising: a hopper having a bottom wall with front, back and side walls extending upwardly therefrom, a first set of material discharge ports in said bottom wall, a second set of material discharge ports in one of said front and back walls and disposed adjacent said bottom wall, said second set of discharge ports having an open position while said first set of discharge ports are open, a rotary agaitator in said hopper operating adjacent said ports, means to drive said agitator to revolve across said first and second sets of discharge ports to discharge hopper material out of said ports, and valve plate means having a portion closing said second set of discharge ports while permitting said first set of discharge ports to be open to confine the discharge of material from said hopper to said first set of discharge ports, said valve plate means being removable from said position to open said second set of discharge ports while said first set of discharge ports are open, whereby to provide for discharge of material from said hopper through both said first and second sets of discharge ports to increase the discharge of material from said hopper over above that which can be discharged through said first set of discharge ports.*

*28. A material spreader for distributing fertilizers, ground treatment materials and seeds and the like, comprising: a hopper having a bottom wall with front, back and side walls extending upwardly therefrom a first set of material discharge ports in said bottom wall, a second set of material discharge ports in one of said front and back walls and disposed adjacent said bottom wall, a rotary agitator in said hopper operating adjacent said ports, means to drive said agitator to revolve across said first and second sets of discharge ports to discharge hopper material out of said ports, valve plate means comprising first and second valve plate portions, said first valve plate portion having a position closing said second set of discharge ports while permitting said first set of discharge ports to be open to confine the discharge of material from said hopper to said first set of discharge ports, said first valve plate portion being removable from said position to open said second set of discharge ports while said first set of discharge ports are open, whereby to provide for discharge of material from said hopper through both said first and second sets of discharge ports to increase the discharge of material from said hopper over and above that which can be discharged through said first set of discharge ports, and means for moving said second valve plate portion relative to said first set of discharge ports for varying the effective size of said first set of ports to vary the quantity of material discharged from said hopper through said first set of discharge ports.*

References Cited in the file of this patent or the original patent

UNITED STATES PATENTS

| | | |
|---|---|---|
| 889,738 | Weber | June 2, 1908 |
| 2,465,117 | Pierson et al. | Mar. 22, 1949 |
| 2,624,492 | Seltzer | Jan. 6, 1953 |
| 2,778,540 | Seltzer | Jan. 22, 1957 |